US009062696B2

(12) United States Patent
Demerath et al.

(10) Patent No.: US 9,062,696 B2
(45) Date of Patent: Jun. 23, 2015

(54) METHOD OF ASSEMBLING A COMPONENT AND FASTENING CLIP

(75) Inventors: Michael Demerath, Hueffler (DE); Anton Fischer, Schechingen Leinweiler (DE)

(73) Assignee: TRW AUTOMOTIVE ELECTRONICS & COMPONENTS GMBH, Radolfzell (DE)

( * ) Notice: Subject to any disclaimer, the term of this patent is extended or adjusted under 35 U.S.C. 154(b) by 590 days.

(21) Appl. No.: 13/342,263

(22) Filed: Jan. 3, 2012

(65) Prior Publication Data
US 2012/0192388 A1 Aug. 2, 2012

(30) Foreign Application Priority Data
Jan. 28, 2011 (DE) .......................... 10 2011 009 683

(51) Int. Cl.
| F16B 13/06 | (2006.01) |
| F16B 1/00 | (2006.01) |
| B60R 13/02 | (2006.01) |
| B60R 21/217 | (2011.01) |
| F16B 5/06 | (2006.01) |
| F16B 19/10 | (2006.01) |
| F16B 21/06 | (2006.01) |
| F16B 5/12 | (2006.01) |
| F16B 21/07 | (2006.01) |
| F16B 21/08 | (2006.01) |

(52) U.S. Cl.
CPC ......... *F16B 1/0071* (2013.01); *Y10T 29/49947* (2013.01); *Y10T 24/44966* (2013.01); *B60R 13/0206* (2013.01); *B60R 21/217* (2013.01); *F16B 5/0685* (2013.01); *F16B 5/125* (2013.01); *F16B 19/1081* (2013.01); *F16B 21/065* (2013.01); *F16B 21/076* (2013.01); *F16B 21/086* (2013.01)

(58) Field of Classification Search
USPC .................... 411/41, 45, 46, 48, 55, 508, 509
See application file for complete search history.

(56) References Cited

U.S. PATENT DOCUMENTS

| 2,391,298 | A | * | 12/1945 | Davis ............................ 411/508 |
| 3,693,494 | A | * | 9/1972 | Meyer ........................... 411/508 |
| 4,262,394 | A | * | 4/1981 | Wright .......................... 411/548 |
| 5,026,201 | A |   | 6/1991 | Dehn et al. |
| 5,028,187 | A | * | 7/1991 | Sato ............................... 411/48 |
| 5,568,952 | A | * | 10/1996 | Ruegg ........................... 292/318 |
| 6,264,413 | B1 | * | 7/2001 | Bisping et al. ............. 411/372.6 |

(Continued)

FOREIGN PATENT DOCUMENTS

| CN | 1289337 | 12/2006 |
| DE | 102004025698 | 12/2005 |

(Continued)

*Primary Examiner* — Roberta Delisle
(74) *Attorney, Agent, or Firm* — Tarolli, Sundheim, Covell & Tummino LLP

(57) ABSTRACT

In a method of assembling a component by means of a fastening clip (100), the fastening clip (100) comprising a latching portion (106) and a head element (104), the head element (104) is transferred from a preliminary mounting position to a final mounting position for assembling the component. An enabling element (112) is provided which is transferred from a first position in which a machine-readable code (114) applied on the fastening clip (100) can not be read, to a second position in which the code (114) can be read, when the head element (104) is transferred to the final mounting position.

16 Claims, 5 Drawing Sheets

(56) References Cited

U.S. PATENT DOCUMENTS

| | | |
|---|---|---|
| 6,932,552 B2 * | 8/2005 | Anscher et al. ............... 411/41 |
| 7,077,449 B2 | 7/2006 | Tokunaga |
| 7,178,206 B2 * | 2/2007 | Kuhnle et al. ................. 24/297 |
| 7,677,598 B1 | 3/2010 | Ryan et al. |
| 2002/0146282 A1 | 10/2002 | Wilkes et al. |
| 2005/0285377 A1 | 12/2005 | Meyendorff et al. |
| 2007/0145140 A1 | 6/2007 | Yoshimura et al. |
| 2007/0172327 A1 * | 7/2007 | Hansen ........................ 411/41 |
| 2009/0044385 A1 | 2/2009 | Naderer et al. |
| 2010/0126004 A1 * | 5/2010 | Chiapuzzi ..................... 29/720 |

FOREIGN PATENT DOCUMENTS

| | | |
|---|---|---|
| DE | 202005018240 | 4/2006 |
| DE | 102006052836 | 5/2008 |
| GB | 2239723 | 7/1991 |
| GB | 2364092 | 1/2002 |
| JP | 2010077989 | 4/2010 |
| WO | 98/23873 | 6/1998 |
| WO | 01/27906 | 4/2001 |

* cited by examiner

Fig. 1
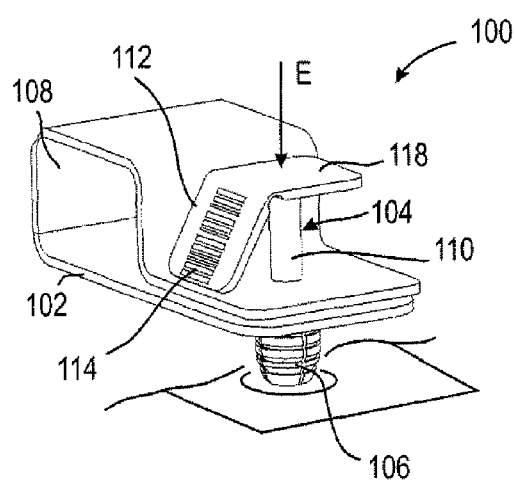
Fig. 2
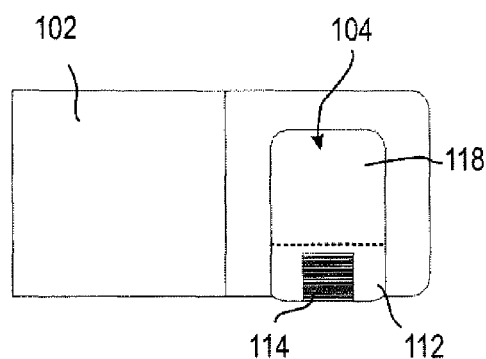
Fig. 3
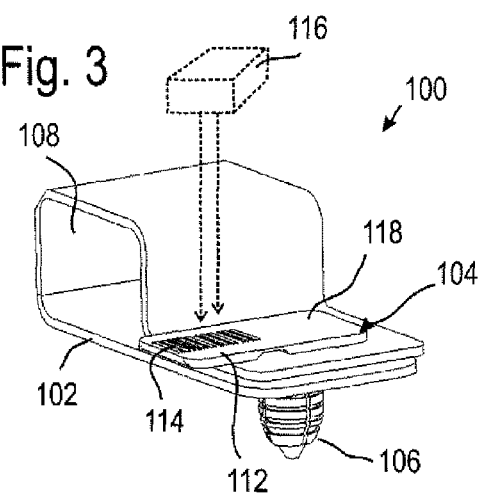
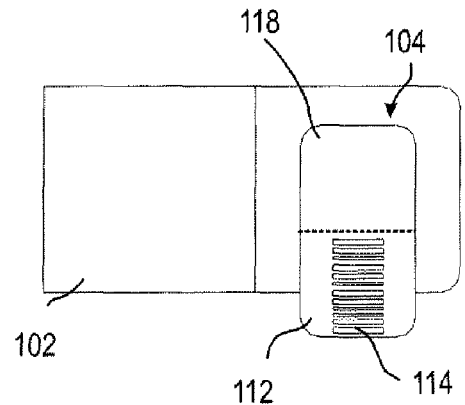
Fig. 4

Fig. 5
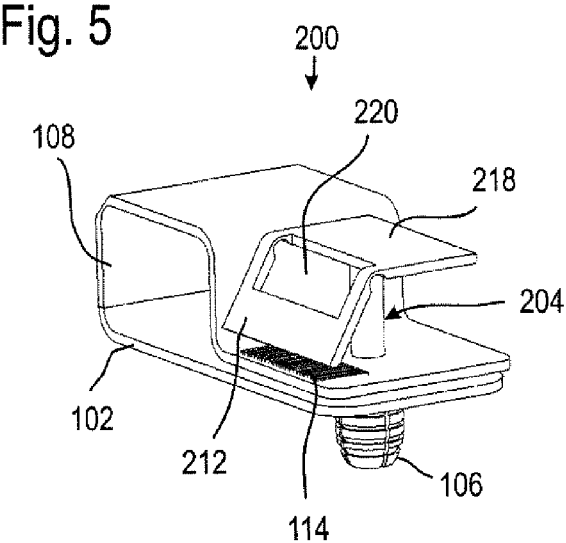
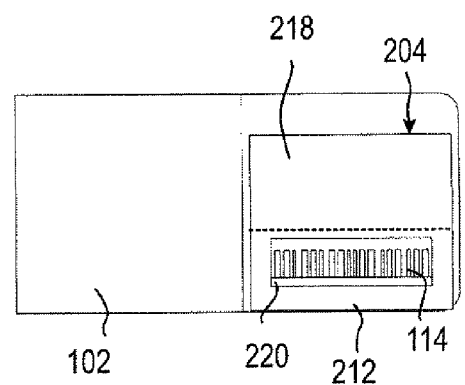
Fig. 6
Fig. 7
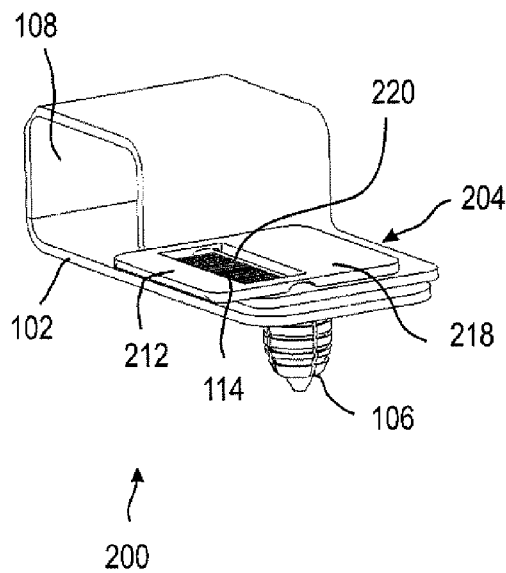
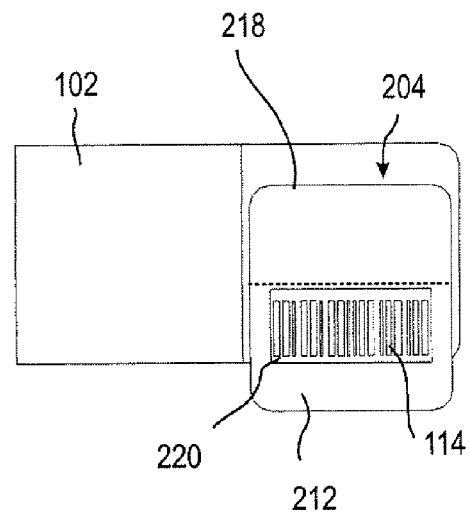
Fig. 8

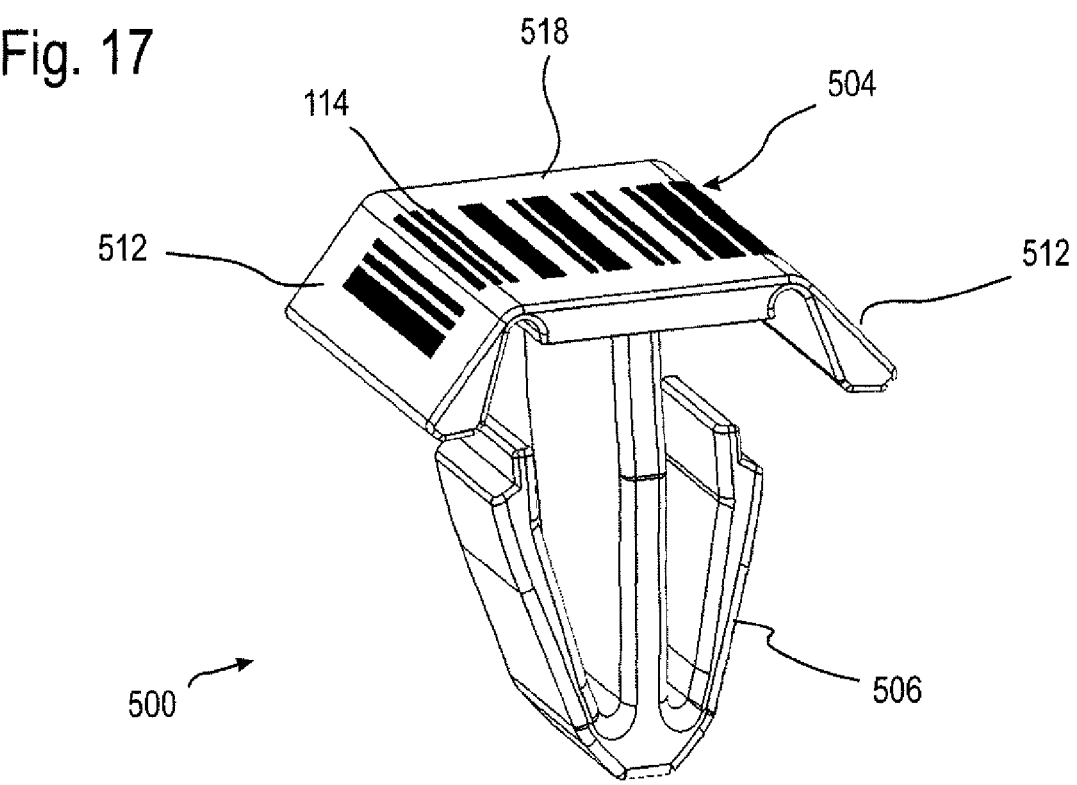

METHOD OF ASSEMBLING A COMPONENT AND FASTENING CLIP

BACKGROUND OF THE INVENTION

The invention relates to a method of assembling a component by means of a fastening clip as well as to a fastening clip.

Fastening clips are used to fix attachment parts to a vehicle body in a quick and reliable manner. The fastening clip, for instance, comprises a latching portion which is inserted in a vehicular opening and latches in place therein, and a head element which is inserted in the latching portion. The component to be fastened (e.g. a lining part or a gas bag module) is either directly fixed by means of the latching portion, for instance if the latter is realized as a fastening clamp, or to a body provided on the latching portion, for instance the latter is realized as a dowel. The component to be fastened may also be connected to the head element.

With a fastening clip realized in two pieces, the latching portion and the head element are provided with complementary latching elements which are made to engage each other by an insertion movement. In the inserted final mounting position, the head element also prevents that the latching portion can be withdrawn again from the opening of the vehicle body.

For easier processing, it is known to pre-fix the latching portion and the head element to each other in a preliminary mounting position so that the fastening clip can be handled in the form of one single component. In the preliminary mounting position, the latching portion can be inserted in the opening on the vehicle body, and the component to be fastened can be fixed to the fastening clip. For the final fixing of the fastening clip to the vehicle body, the head element is transferred from its preliminary mounting position to the final mounting position.

In case the fastening clip is realized in one piece, the latching portion and the head element are integrally connected to each other. The head element is loaded in the direction of insertion in order to latch the latching portion in the opening.

In this case, the preliminary mounting position corresponds to a position in which the latching portion is not yet inserted in the opening or not yet fully inserted therein.

Fastening clips of this type are installed in the vehicle in larger numbers and in many instances at places which are poorly accessible. An evidence for the fact that all the fastening clips have been correctly locked in the final mounting position is desirable but expensive.

It is the object of the invention to allow a documentation of the correct fastening of a fastening clip in a simple manner.

SUMMARY OF THE INVENTION

According to the invention, this is achieved by assembling a component by means of a fastening clip comprising a latching portion and a head element which is transferred from a preliminary mounting position to a final mounting position for assembling the component, the fastening clip being provided with an enabling element which is transferred from a first position in which a machine-readable code applied on the fastening clip can not be read, to a second position in which the code can be read, when the head element is being transferred to the final mounting position. The machine-readable code can not be correctly read by a reader unless the fastening clip is in its final mounting position. In the preliminary mounting position, however, the enabling element prevents that the code can be read, i.e. identified in a correct manner.

Since any process of reading a code, here put on a level with identifying same, means that the fastening clip has been correctly mounted, the read-out code also allows to document that the fastening clip has been correctly installed. Thus, the method represents a simple control possibility in terms of the assembly of the fastening clip as well as a simple documentation possibility for the installed fastening clips.

A reader which is specific for the respective code type is used for reading the code. The possibility to read the code depends on a specific reading position in relation to the fastening clip, of course. According to the invention, however, the fastening clip is realized such that the reading position with respect to a specific fastening clip is preferably fixed; this means that the reader is not moved relative to the fastening clip but is held in a fixed position with respect to the fastening clip. Regarding such a predetermined reading position, the code can only be read if the head element is in the final mounting position.

It is also possible to design the enabling element such that the code is complete only in the second position. Then, the reading position is variable to the extent that the code can be read in any position in which it is in the visual range of the reader.

It is preferred that a documentation is made whether it was possible to read the code or whether an error message was issued.

It is preferred that the method is carried out for all fastening clips to be installed in a working step, where it will be detected and recorded for each fastening clip whether it was possible to read a code.

If the code could not be read, a warning may be issued so that the assembly fault can be eliminated at once.

The invention also relates to a fastening clip which in particular can be used in a method as just described. The fastening clip comprises a latching portion and a head element, and can be moved from the preliminary mounting position to a final mounting position, a machine-readable code and an enabling element being provided which is coupled to the head element such that it is moved to the final mounting position in case of a movement of the head element. In the preliminary mounting position, the enabling element is in a first position in which the code can not be read, and in the final mounting position it is located in a second position in which the code can be read. The readability (detectability) of the code thus depends on the mounting position of the fastening clip. The mechanical movement of the enabling element, for instance effected by the relative motion of the head element and the latching portion or by a relative motion of the fastening clip with respect to a vehicle-fixed component, results in that the code is exposed and can be read and identified by a reader from a predetermined reading position.

Here, a code is meant to be a complete sequence of coding symbols which contains the entire meaning of the coded information.

It is preferred that a bar code is used for the code. Bar codes consist of a sequence of parallel lines and gaps of differing width. This type of code can be easily and cheaply applied on diverse surfaces and code any information. Bar code readers are available in various designs and they are reliable and inexpensive.

The code may be applied, for instance, by printing, gluing or embossing; the application may be performed directly on one or more of the components of the fastening clip which are movable relative to each other or on a component connected thereto.

There are various ways as how to achieve an exposing of the machine-readable code using an enabling element. In the following, some embodiments of the invention will be described by example in more detail.

In one possible implementation of the invention, at least a portion of the code is applied on the enabling element itself.

The enabling element advantageously changes its spatial position and/or its orientation with respect to the latching portion or the head element when the head element is being moved to the final mounting position.

The enabling element may be a plate, for instance, which is movably connected to the head element.

In this arrangement, it is possible to apply the entire code on the enabling element and, in the first instance, to incline the latter with respect to the predetermined reading position and the predetermined reading direction such that the code can not be read in the first position, e.g. because in the case of a bar code the reader is not able to resolve the code due to the steep angle. In attempting to read the code, an error message is issued. Due to the head element being moved to the final mounting position, the angle taken up by the enabling element carrying the code with respect to the reader in the predetermined reading position is altered such that the code can be detected and read in the second position of the enabling element.

In one possible embodiment of the invention, the enabling element in the first position extends at an acute angle in relation to a longitudinal axis of the head element, and by moving along the longitudinal axis for shifting the head element from the preliminary mounting position to the final mounting position, the angle between the enabling element and the longitudinal axis is increased.

The movement of the enabling element can be effected in each case in that it comes into contact with a part of the fastening clip or a vehicle-fixed component.

It is also possible to arrange only a portion of the code on the enabling element and to provide a separate code base element on which at least a second portion of the code is applied. In doing so, the enabling element is moved relative to the code base element during the movement of the head element with respect to the latching portion. The code portions on the enabling element and on the code base element complement each other to form the entire code.

Here, the enabling element may extend in the first position, for instance, at an angle with respect to the code base element, whereas in the second position the enabling element and the code base element preferably lie in a plane. During the reading process in the preliminary mounting position, a part of the code is not detected at all or with too small distances between the individual bar code lines which is due to the angle between the two code portions. In this arrangement, the reader is preferably set such that it recognizes this deviation and rejects the code as not readable. Only if there is an angle which is smaller than a defined angle between the two code portions and preferably both code portions lie in a plane, the code will be identified.

Two enabling elements may also be provided, which are moved relative to each other or with respect to a code base element. A two-piece or even three-piece code may be realized here. Using a higher number of enabling elements would also be conceivable.

Another implementation of the idea of the invention results in embodiments in which the enabling element is a masking plate which covers a portion of the code in the first position. In this case, the code can not be completely read in the first position, but only when the masking plate in the second position has been moved such that the entire code is exposed with respect to the reader.

The masking plate may comprise a window, for example, allowing the reader an unhindered view on the entire code only if the head element is in the final mounting position and hence the enabling element in the second position.

In another embodiment, the masking plate is coupled to the head element such that said plate is removed from the code in the second position. Here, for instance, the masking plate is pulled away from the code base element by the movement of the head element so that the code base element is exposed in the second position with respect to the reader.

In doing so, the masking plate may be pulled into an intermediate space between the latching portion and the head element, for instance. It is also possible that the masking plate breaks away during the movement of the head element.

It is possible to provide several masking plates e.g. in the form of narrow webs each covering a portion of the code.

The code can be designed such that it allows an unambiguous identification of the fastening element. To give an example, specific codes may be used for the attachment of specific components, for example of a side airbag on a roof frame.

Shifting the head element from the preliminary mounting position to the final mounting position can be effected by a linear movement in the direction of the longitudinal axis of the head element. It is also conceivable, however, that the shifting to the final mounting position is carried out by a rotation. In this case, for instance, the individual code portions may first be arranged in a plane at an angle relative to each other, and in the second position they can be linearly aligned so that the code can be read.

BRIEF DESCRIPTION OF THE DRAWINGS

The invention will now be explained in more detail below on the basis of several exemplary embodiments with respect to the attached drawings in which:

FIG. 1 shows a fastening clip according to the invention for use in a method of the invention according to a first embodiment in a schematic perspective view, with the head element being in a preliminary mounting position;

FIG. 2 shows the fastening clip of FIG. 1 in a top view;

FIG. 3 shows the fastening clip of FIG. 1, the head element being in a final mounting position;

FIG. 4 shows the fastening clip of FIG. 3 in a top view;

FIG. 5 is a schematic perspective illustration of a fastening clip according to the invention for use in a method of the invention according to a second embodiment, with the head element being in the preliminary mounting position;

FIG. 6 shows the fastening clip of FIG. 5 in a top view;

FIG. 7 shows the fastening clip of FIG. 5, the head element being in the final mounting position;

FIG. 8 shows the fastening clip of FIG. 7 in a top view;

FIG. 17 is a schematic perspective illustration of a fastening clip according to the invention for use in a method of the invention according to a fifth embodiment.

DESCRIPTION OF EXEMPLARY EMBODIMENTS

Figure 9:
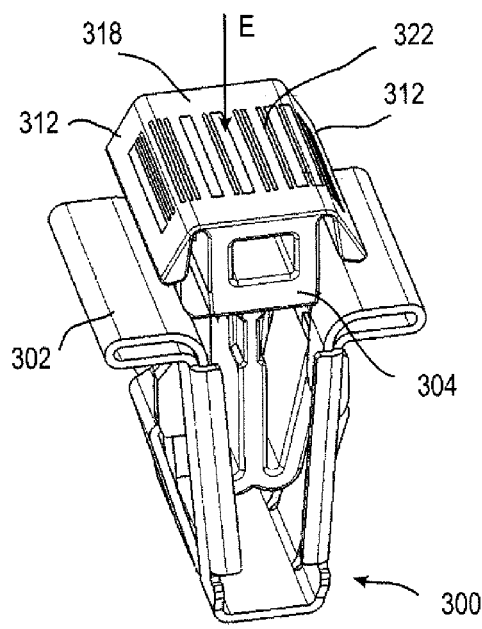
FIG. 9 is a schematic perspective illustration of a fastening clip according to the invention for use in a method of the invention according to a third embodiment, with the head element being in the preliminary mounting position.

FIG. 1 shows a fastening clip 100 serving for fastening a component to a vehicle body. The fastening clip 100 has a two-piece design and comprises a holding piece 102 and a head element 104. The holding piece 102 comprises a latching portion 106 which can be inserted in an opening in the vehicle body indicated in FIG. 1 and latched therein, i.e. fastened in such a manner that it is firmly anchored at this place when exposed to the usually acting forces. Moreover, the holding piece 102 has a mounting 108 formed thereon which is shaped here such that a side gas bag package may be pushed through it and thus connected to the fastening clip 100.

The holding piece 102, in particular the mounting 108, could be designed for the fixation of any other component as well.

The head element 104 and the holding piece 102 (and hence the latching portion 106) can be moved relative to each other in a direction of insertion E. Prior to fastening the fastening clip 100 to the vehicle, the head element 104 is in a pre-assembly position (FIG. 1) in which the head element 104 and the holding piece 102 are connected to each other, but the latching portion 106 of the holding piece 102 can still be pushed into an opening.

Having inserted the holding piece 102 with its latching portion 106 in the opening, the head element 104 is shifted from the preliminary mounting position to the final mounting position for final assembly. The head element 104 comprises a spreading portion 110 cooperating with the latching portion 106 of the holding piece 102 so that e.g. the latching elements on the latching portion 106, which fix the holding piece 102 on the edge of the opening, are spread apart or hindered from being compressed. In this state, the fastening clip 100 can not be removed from the opening.

Fastening clips of this type are known in various designs and are used in a versatile manner. It is not essential for the present invention which type of fastening clips is meant. It only matters that the two parts of the fastening clip are first in a preliminary mounting position, and they are in a final mounting position only after the final attachment on the vehicle, with the head element 104 taking another position relative to the holding piece 102 and the latching portion 106. The direction of insertion E may be oriented linearly in the direction of the longitudinal axis of the head element 104, as in the examples shown here.

It is also possible, however, to provide a rotational movement as the direction of insertion, by which the head element is transferred from the first position to the second position in order to bring the fastening clip from the preliminary mounting position to the final mounting position.

FIGS. 1 and 2 show the fastening clip 100 with the head element 104 in the preliminary mounting position, FIGS. 3 and 4 show the fastening clip 100 with the head element 104 in the final mounting position.

For the purpose of assembling a component on the vehicle body, for instance, several fastening clips are first fixed to the component to be fastened. Then, the fastening clips are inserted in openings of the vehicle body. As a last step, the fastening clips are fixed on the vehicle body by transferring the head elements of the fastening clip from the preliminary mounting position to the final mounting position. It is only now that the component to be fastened is reliably fastened to the vehicle body.

In order to be able to document that each of the fastening clips 100 is correctly latched and each of the head elements 104 has been correctly transferred to the final mounting position, an enabling element 112 is provided on the fastening clip 100 and coupled to the head element 104. In case of a movement of the head element 104 relative to the holding piece 102 in the direction of insertion E, the enabling element 112 moves from a first position which it occupies if the head element 104 is in the preliminary mounting position, to a second position that it will take if the head element 104 is in the final mounting position.

Arranged on the fastening clip 100 is a machine-readable code 114 which can be detected and read out by a reader 116 from a predetermined reading position (indicated in FIG. 3). In the embodiments which are shown here, the direction of reading is parallel to the direction of insertion E.

The code 114 is always a bar code here, in this case applied on the enabling element 112 by gluing, printing or embossing.

The enabling element 112 serves the purpose that the code 114 can not be read when the enabling element 112 is in the first position, but only when the head element 104 is in the final mounting position and the enabling element 112 is in the second position.

When a fastening clip 100 is completely mounted to the vehicle, an attempt is made to read the code 114 by means of the reader 116 positioned in its predetermined reading position. In case of a successful reading process, the code is noted and documented in the reader 116 or a (not illustrated) electronic system connected thereto. If the code 114 can not be read, however, the reader 116 shows a warning and documents this, too. In that case, it is possible to check the fastening clip 100 and, if necessary, correctly transfer the head element 104 to the final mounting position. A new reading attempt will show that the code 114 can be read, and the correctly performed attachment of the fastening clip 100 is documented.

In the following, several embodiments of fastening clips will be described by means of which this principle is exemplarily explained on the basis of different types of enabling elements.

The first embodiment illustrated in FIGS. 1 to 4 uses an enabling element 112 which changes its orientation during the movement from the first position to the second position, in this case its angle with respect to the longitudinal axis of the head element 104.

In the first position, the enabling element 112 extends at an acute angle in relation to the direction of insertion E; here, it has the shape of an elongated plate and is pivotally hinged to a press-in portion 118 of the head element 104 via a film hinge. As seen from the predetermined reading position of the reader 116, the code 114 is presented in the form illustrated in FIG. 2.

In this case, the reader 116 sees that the intervals of the individual lines of the bar code fall below a predefined minimum distance so that the code can not be resolved. In case of attempting to read out the code 114 on the fastening clip 100 in the position shown in FIGS. 1 and 2, in which the enabling element 112 is in the first position, the reader 116 issues an error message.

Pressing down the press-in portion 118 of the head element 104 in the direction of insertion E results in the enabling element 112 being swiveled due to the contact with the body of the holding piece 102 so that the angle with respect to the direction of insertion increases. In the example illustrated here, the enabling element 112 lies in a plane with the press-in portion 118 when the head element 104 is completely inserted (correct final mounting position). If an attempt is now made to read the code 114 by means of the reader 116, this is successful and the read-out code as well as the acknowledgement of the successful reading process is stored in the reader 116.

In this example, the code 114 is applied on the enabling element 112 in its entirety.

FIGS. 5 to 8 illustrate a second embodiment of a fastening clip 200. The holding piece 102 substantially has the same design as the holding piece of the first embodiment so that reference numerals which have already been introduced are maintained here.

FIGS. 5 and 6 show the fastening clip 200 in the preliminary mounting position of the head element 204, whereas FIGS. 7 and 8 illustrate the fastening clip 200 with the head element 204 in the final mounting position.

Unlike the first embodiment, the plate-shaped enabling element 212 is realized in the form of a masking plate comprising a window 220.

In this case, the code 114 is applied on a plane portion of the holding piece 102; the code 114 and the window 220 in the enabling element 212 are aligned relative to each other such that during any reading attempt by the reader 116 (illustrated only in the first embodiment), being in the same predetermined reading position as in the first embodiment, only a portion of the code 114 can be identified which is not sufficient for successively reading the code 114. In this case (FIGS. 5 and 6) in which the enabling element 212 is in the first position, the reader 116 will issue an error message.

Only when the head element 204 has taken its correct final mounting position and hence the enabling element 212 is in the second position, the window 220 lies above the code 114 such that the latter can be detected in its entirety by the reader 116.

It goes without saying that variations are conceivable in which a first portion of the code 114 is applied on the holding piece 102 and a second portion of the code is applied on the enabling element 212. In the second position of the enabling element, the two portions of the code 114 complement each other to form the complete code 114 and can be read by the reader 116 in this position only. The code 114 can be read in these and similar situations if the reader 116 is in a position in which it is able to detect the code 114. Therefore, the predetermined reading position is variable to a certain extent.

FIGS. 9 to 12 show a third embodiment of a fastening clip 300.

The holding piece 302 is realized as a basically V-shaped latching clip, the latching portions 306 being realized as shoulders on the outer surfaces of the latching clip. The head element 304 is realized as a push-in piece which can be inserted in the latching clip. In this case, too, a linear movement in the direction of insertion E (in case of the Figures vertically downward) makes the head element 304 shift from its preliminary mounting position shown in FIGS. 9 and 10 to the final mounting position illustrated in FIGS. 11 and 12.

In this case, a first section of the code 114 in the form of a code base element 322 is arranged on the press-in portion 318 of the head element 304. To the right and to the left of the press-in portion 318, an enabling element 312 in the form of a plate is connected to the press-in portion 318 by means of a film hinge as in the first embodiment. Each of the two enabling elements 312 carries a further section of the code 114.

Figure 10:
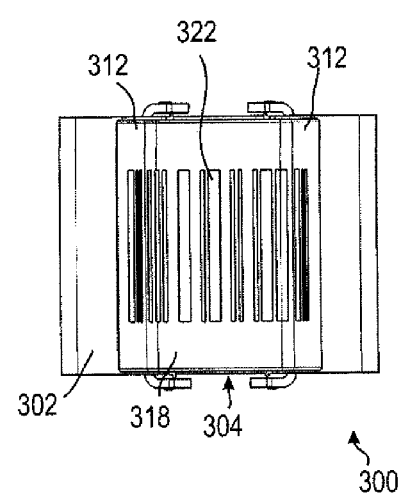
FIG. 10 shows the fastening clip of FIG. 9 in a top view.
Figure 11:
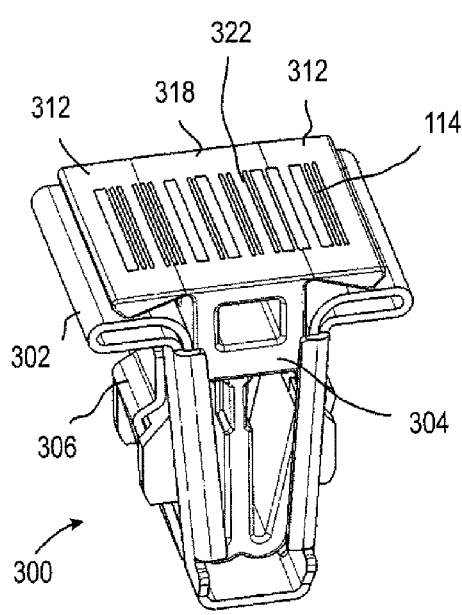
FIG. 11 shows the fastening clip of FIG. 9, the head element being in the final mounting position.
Figure 12:
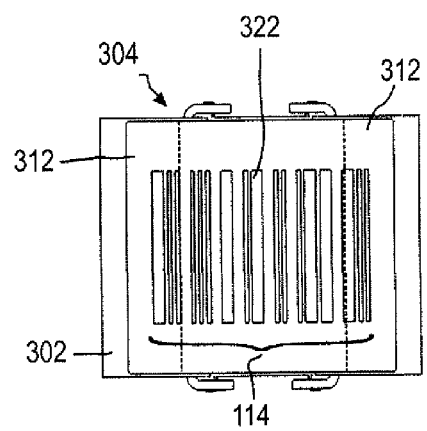
FIG. 12 shows the fastening clip of FIG. 11 in a top view.
Figure 13:
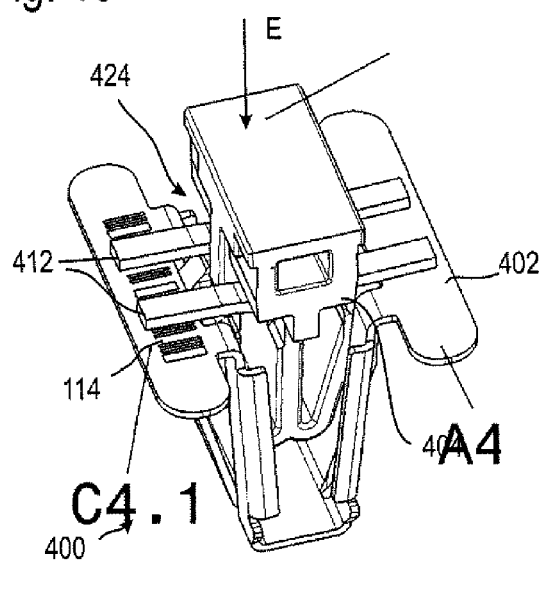
FIG. 13 is a schematic perspective illustration of a fastening clip according to the invention for use in a method of the invention according to a fourth embodiment, with the head element being in the preliminary mounting position.
Figure 14:
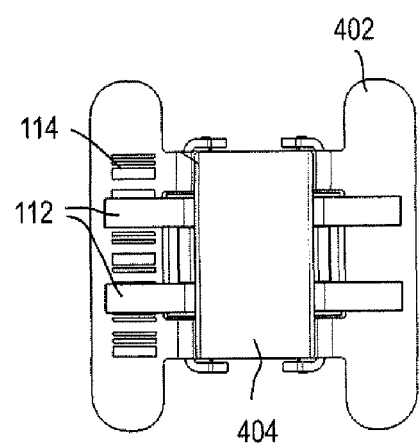
FIG. 14 shows the fastening clip of FIG. 13 in a top view.
Figure 15:
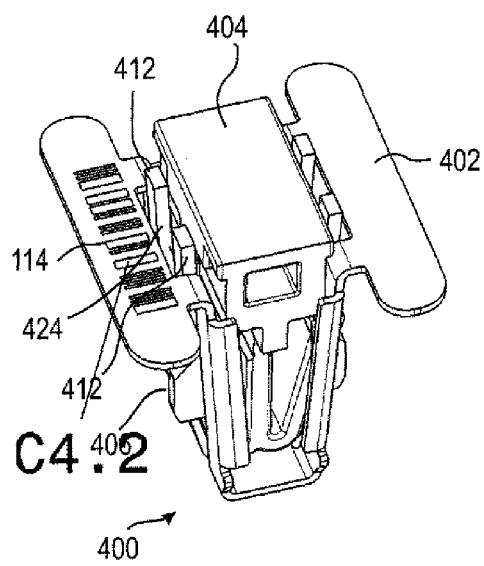
FIG. 15 shows the fastening clip of FIG. 13, the head element being in the final mounting position.
Figure 16:
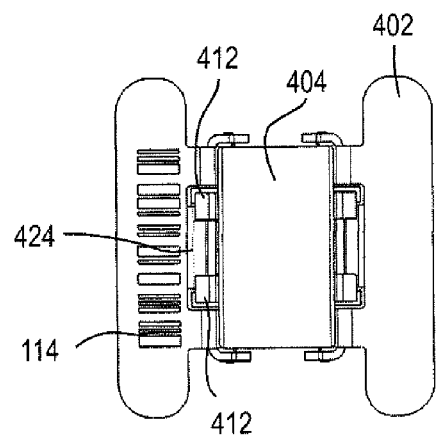
FIG. 16 shows the fastening clip of FIG. 15 in a top view.

In the first position of the enabling elements 312, these hang down at an acute angle relative to the direction of insertion E so that the code can not be read by the (not illustrated) reader 116. FIG. 10 shows the image which is presented to the reader 116 in the predetermined reading position.

Only when the head element 304 has taken its final mounting position after the push-in process in the direction of insertion E, with the two enabling elements 312 having been swiveled relative to the press-in portion 318 due to having contact with portions of the holding piece 302, the press-in portion 318 and the two enabling elements 312 are in one plane. The code 114 can now be read by the reader 116.

In the fourth embodiment illustrated in FIGS. 13 to 16, a fastening clip 400 is shown whose basic shape corresponds essentially to the one of the fastening clip 300 of the third embodiment.

In this case, as in the second embodiment, the entire code 114 is applied on a planar portion of the holding piece 402.

Two enabling elements 412 in the form of narrow webs are coupled to the head element 404 via film hinges and rest on the holding piece 402 in the first position (FIGS. 13 and 14) such that they will cover some portions of the code 114. A reading attempt from out of the predetermined reading position results in an error message, since not the entire code 114 is visible.

During pushing in the head element 404 in the direction of insertion E from the preliminary mounting position to the final mounting position, the enabling elements 412 are pulled into an intermediate space 424 between the holding piece 402 and the head element 404 and hence removed from the code 114. Thus, the code 114 is completely exposed and can be read and the fastening clip 400 can be documented as having been correctly mounted.

FIG. 17 illustrates a fifth embodiment of a fastening clip 500. In this case, the fastening clip 500 is realized in one piece so that the head element 504 continues into the latching portion 506. The head element 504 and the latching portion 506 can not be moved relative to each other.

As in the third embodiment, one enabling element 512 each is articulated on two opposite sides of a press-in portion 518 of the head element 504. Both the press-in portion 518 and the two enabling elements 512 carry a code portion each.

When the fastening clip 500 is inserted in the opening as far as to its final mounting position, the code portions on the enabling elements 512 are transferred—due to making contact with the vehicle body or another vehicle-fixed component—so as to lie in one plane with the code portion of the press-in portion 518. In this state, the code 114 can be read by the reader 116 when it detects the code 114.

It goes without saying that the other embodiments which have been described for a two-piece fastening clip can also be transferred to a one-piece fastening clip.

Obviously, many different further variants are conceivable for implementing the principle of attaching a machine-readable code to a fastening clip in such a manner that the code is exposed to a reader when an enabling element moves from a first to a second position. To give an example, a head element can be used which is moved from the preliminary mounting position to the final mounting position by a rotation about its axis. In this arrangement, the code may be divided in two parts which are brought together to form a readable full code by rotating the head element.

The invention claimed is:
1. A fastening clip comprising:
a latching portion (106; 206; 306; 406; 506), a head element (104; 204; 304; 404; 504), which can be transferred from a preliminary mounting position to a final mounting position, a machine-readable code (114), and an enabling element (112; 212; 312; 412; 512) being provided which is coupled to the head element (104; 204; 304; 404; 504) such that it is moved to the final mounting position in case of a movement of the head element (104; 204; 304; 404; 504) and which, in the preliminary mounting position, is in a first position in which the code (114) cannot be read, and in the final mounting position is in a second position in which the code (114) can be read.

2. The fastening clip according to claim 1, wherein at least a portion of the code (114) is applied on the enabling element (112; 312).

3. The fastening clip according to claim 1, wherein a code base element (322) is provided on which at least a portion of the code (114) is applied, the enabling element (312) being moved relative to the code base element (322) if the head element (304) is moved with respect to the latching portion (306).

4. The fastening clip according to claim 3, wherein the enabling element (312) extends at an angle relative to the code base element (322) in the first position.

5. The fastening clip according to claim 1, wherein two enabling elements (312; 412; 512) are provided.

6. The fastening clip according to claim 1, wherein the enabling element (212; 412) is a masking plate which covers a part of the code (114) in the first position.

7. The fastening clip according to claim 6, wherein the masking plate comprises a window (220).

8. The fastening clip according to claim 6, wherein the masking plate is coupled to the head element (404) such that it is removed from the code (114) in the second position.

9. The fastening clip according to claim 1, wherein the code (114) is a bar code.

10. The fastening clip according to claim 1, wherein the code (114) is applied by printing, gluing or embossing.

11. The fastening clip according to claim 1, wherein the enabling element (112; 212; 312; 412; 512) is a plate which is movably connected to the head element (104; 204; 304; 404; 504).

12. The fastening clip according to claim 1, wherein the enabling element (112; 212; 312; 512) extends at an acute angle relative to a longitudinal axis of the head element (104; 204; 304; 504) in the first position.

13. A fastening clip for fastening a component to a vehicle body comprising:

a latching portion for insertion into an opening in the vehicle body;

a head element connected to the latching portion and movable from a preliminary mounting position to a final mounting position;

an enabling element coupled to the head element and movable from a first position when the head element is in the preliminary mounting position to a second position when the head element is in the final mounting position; and a machine-readable code provided on the fastening clip and being unreadable when the enabling element is in the first position and readable when the enabling element is in the second position.

14. The fastening clip according to claim 13, wherein the code moves with the enabling element relative to the head element as the enabling element moves between the first position and the second position.

15. The fastening clip according to claim 14, wherein the enabling element is pivotable relative to the head element between the first position and the second position.

16. A method of assembling a component by means of a fastening clip (100; 200; 300; 400; 500) comprising:

inserting the fastening clip (100; 200; 300; 400; 500) into an opening in the component, the fastening clip (100; 200; 300; 400; 500) comprising a latching portion (106; 306; 406; 506), a head element (104; 204; 304; 404; 504), an enabling element (112; 212; 312; 412; 512) coupled to the head element (104; 204; 304; 404; 504), and a machine-readable code (114), the head element (104; 204; 304; 404; 504) being transferrable from a preliminary mounting position to a final mounting position for assembling the component, the enabling element (112; 212; 312; 412) having a first position when the head element (104; 204; 304; 404; 504) is in the preliminary mounting position in which the machine-readable code (114) applied on the fastening clip (100; 200; 300; 400; 500) cannot be read, and a second position when the head element (104; 204; 304; 404; 504) is in the final mounting position in which the code (114) can be read;

reading the code (114) with a reader used in a predetermined reading position;

documenting whether the code (114) could be read; and issuing a warning if it was not possible to read the code (114).

* * * * *